United States Patent
Huang

(10) Patent No.: US 6,707,668 B2
(45) Date of Patent: Mar. 16, 2004

(54) PLATFORM FOR NOTEBOOK COMPUTERS

(76) Inventor: Tai-Shen Huang, PO Box 82-144, Taipei (TW)

( * ) Notice: Subject to any disclaimer, the term of this patent is extended or adjusted under 35 U.S.C. 154(b) by 31 days.

(21) Appl. No.: 10/166,706

(22) Filed: Jun. 12, 2002

(65) Prior Publication Data

US 2003/0231466 A1 Dec. 18, 2003

(51) Int. Cl.[7] .................................................. G06F 1/16
(52) U.S. Cl. ...................... 361/687; 361/695; 248/676; D14/447
(58) Field of Search .................................. 361/687, 695, 361/697; 248/676; 165/80.3, 120–126; D14/447

(56) References Cited

U.S. PATENT DOCUMENTS

| | | | | |
|---|---|---|---|---|
| 4,624,433 A | * | 11/1986 | Henneberg | 248/346.06 |
| 5,209,452 A | * | 5/1993 | Goldberg | 248/676 |
| 6,094,347 A | * | 7/2000 | Bhatia | 361/695 |
| D455,755 S | * | 4/2002 | Levine et al. | D14/447 |
| 6,474,614 B2 | * | 11/2002 | MacEachern | 248/349.1 |

* cited by examiner

Primary Examiner—Darren Schuberg
Assistant Examiner—Anthony Q. Edwards
(74) Attorney, Agent, or Firm—Leong C. Lei

(57) ABSTRACT

This invention is related to a platform for notebook computers, which includes a spine at the rear edge to make the top of the platform form an inclination, so that when a notebook computer is placed on the platform, the notebook computer will be inclined at an appropriate angle, making the user feel comfortable and find it convenient to operate the notebook computer, and soft pads are used for preventing slippage of the notebook computer. Two electric fans are used for dissipating heat generated by the notebook computer, so as to mice the user feel more comfortable, and prolonging the service life of the notebook computer.

3 Claims, 3 Drawing Sheets

PLATFORM FOR NOTEBOOK COMPUTERS

BACKGROUND OF THE INVENTION

1. Field of the Invention

This invention is related to a platform notebook computers, in particular to one that can make a user feel more comfortable in operating a notebook computer, and increase the dissipation on of heat emanating from the computer.

2. Description of the Prior Art

The conventional notebook computer user is generally flat-shaped, and when in use, it is placed on the table top and the keyboard buttons are located horizontally, so that the operation of keyboard buttons is not ergonomic, and easily causes discomfort. Furthermore, the heat dissipation of the conventional notebook computer is not very effective, and thus the computer will become very hot after a long period of time, which will shorten its service life.

Therefore, it is an object of the invention to provide a platform for a notebook computer that can make a user feel more comfortable in operation a notebook computer, and increasing the heat dissipation efficiency of the computer, thus prolonging its service life.

SUMMARY OF THE INVENTION

This invention is related to a platform for notebook computers, which can make a user feel more comfortable in operating a notebook computer, and can increase the dissipation of heat emanating from the computer.

It is the primary object of the present invention to provide a platform for notebook computers, which includes a spine at the rear edge to make the top of the platform form an inclination, so that when a notebook computer is placed on the platform the notebook computer will be inclined at an appropriate angle, making the user feel comfortable and find it convenient to operate the notebook computer.

It is or object of the present invention to provide a platform for notebook computers which utilizes soft pads for preventing slippage of the notebook computer and electric fans or dissipating heat generated by the notebook computer, so as to make the user feel more comfortable, and prolonging the service life of the notebook computer.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawing in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiment may be made in the function and arrangement of the elements described without departing from the scope of the invention as set forth in the appended claims.

Figure 1:
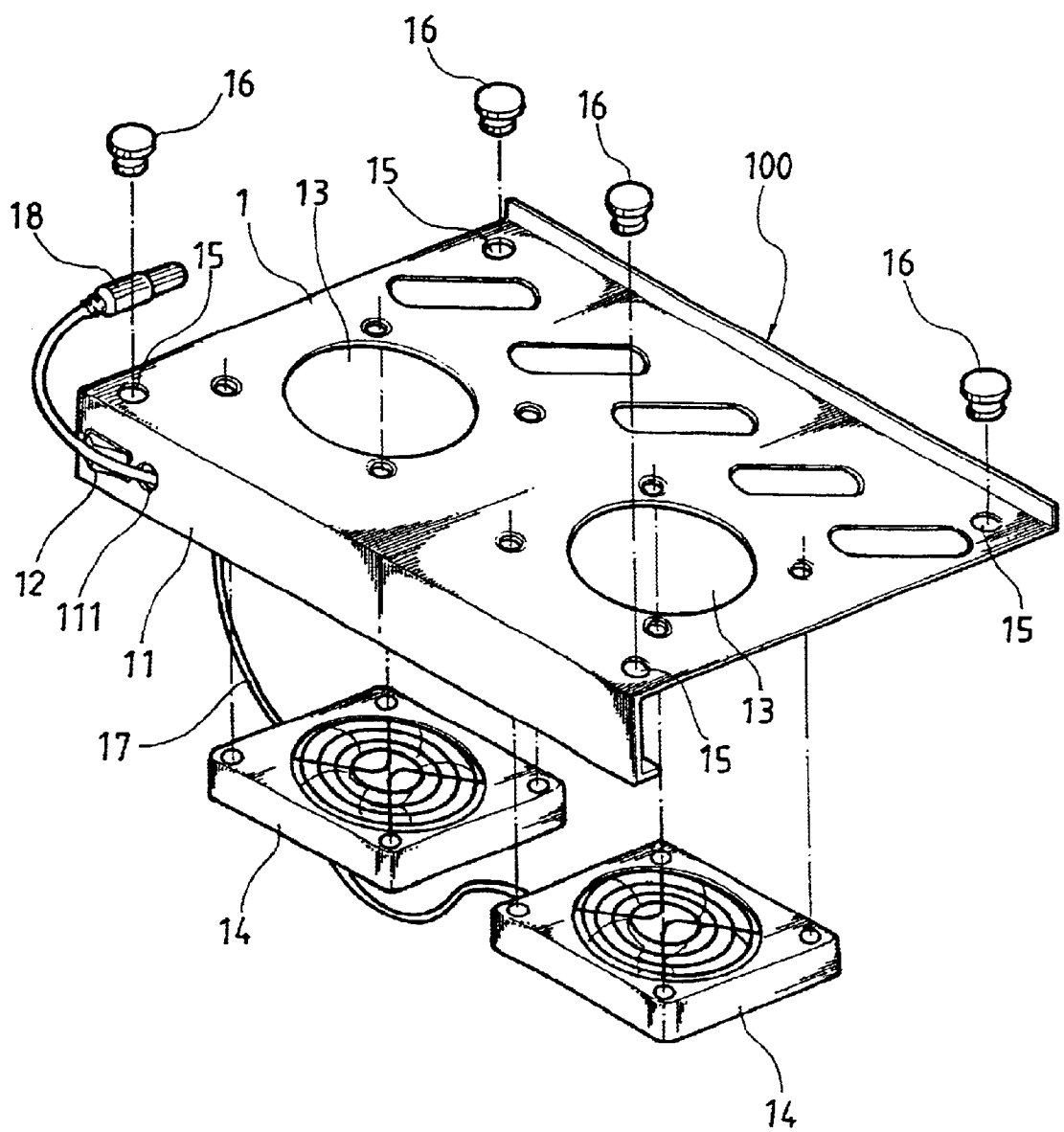
FIG. 1 is an exploded view of the present invention.
Figure 2:
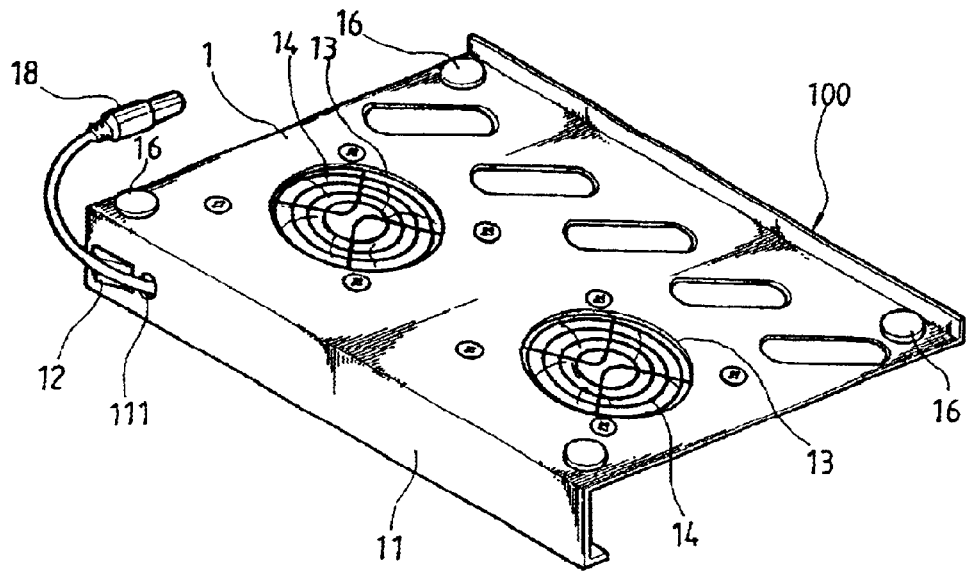
FIG. 2 is a perspective view of the present invention.

With reference to FIGS. 1 and 2, the platform 100 according to the present invention comprises a frame 1, which is bent upwardly at the front edge, and bent downwardly, and then frontwardly at the rear edge, thereby forming a spine 11. The spine is formed with a through hole 111, and provided with a switch 12 close to the through hole 111. The top of the frame 1 has two circular opening 13, under each of which is mounted an electric fan 14. The four corners of the frame 1 each have a fixing hole 15, and in which is fitted a soft pad 16. The electric fan 14 is connected to the switch via electric cord. The switch is connected with an electric cord which extends out of the through hole 111 to engage with an electric plug 18.

By means of the combination of the combination of the above-mentioned component parts, a platform with an appropriate inclination is set up, so t hat a notebook computer can be placed on the platform 100. The electric plug 18 is connected with the notebook computer so that the electric fan 14 can be driven to dissipate the heat generated from the notebook computer. As the notebook computer is placed in an ergonomically correct inclination, the user will feel comfortable in operating the computer.

Figure 3:
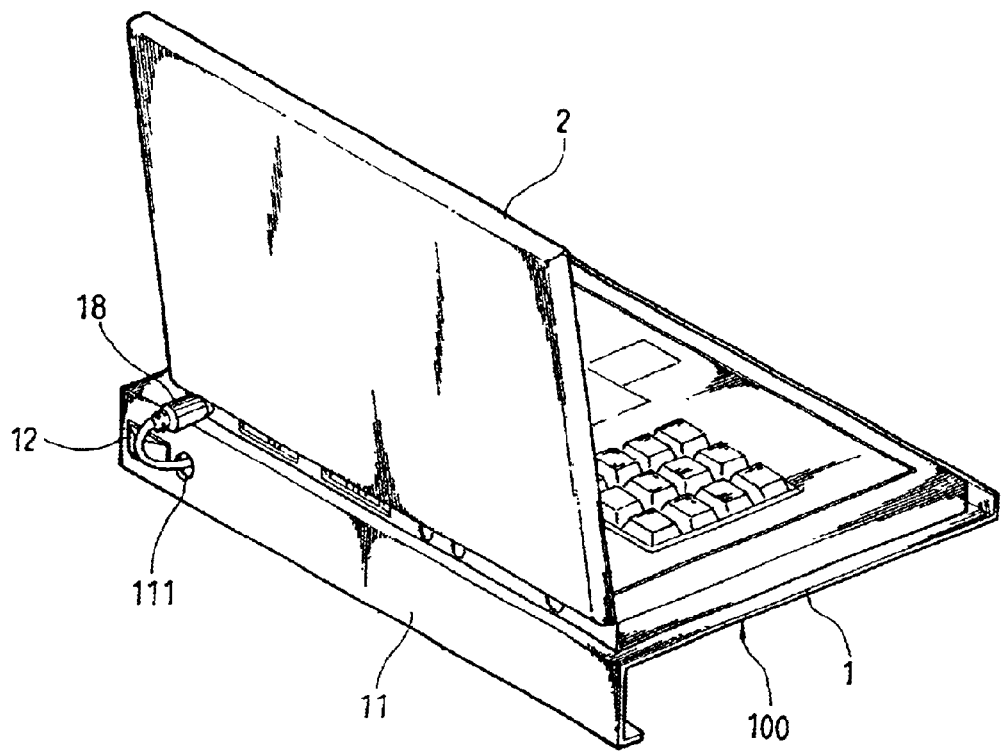
FIG. 3 shows an application of the invention.
Figure 4:
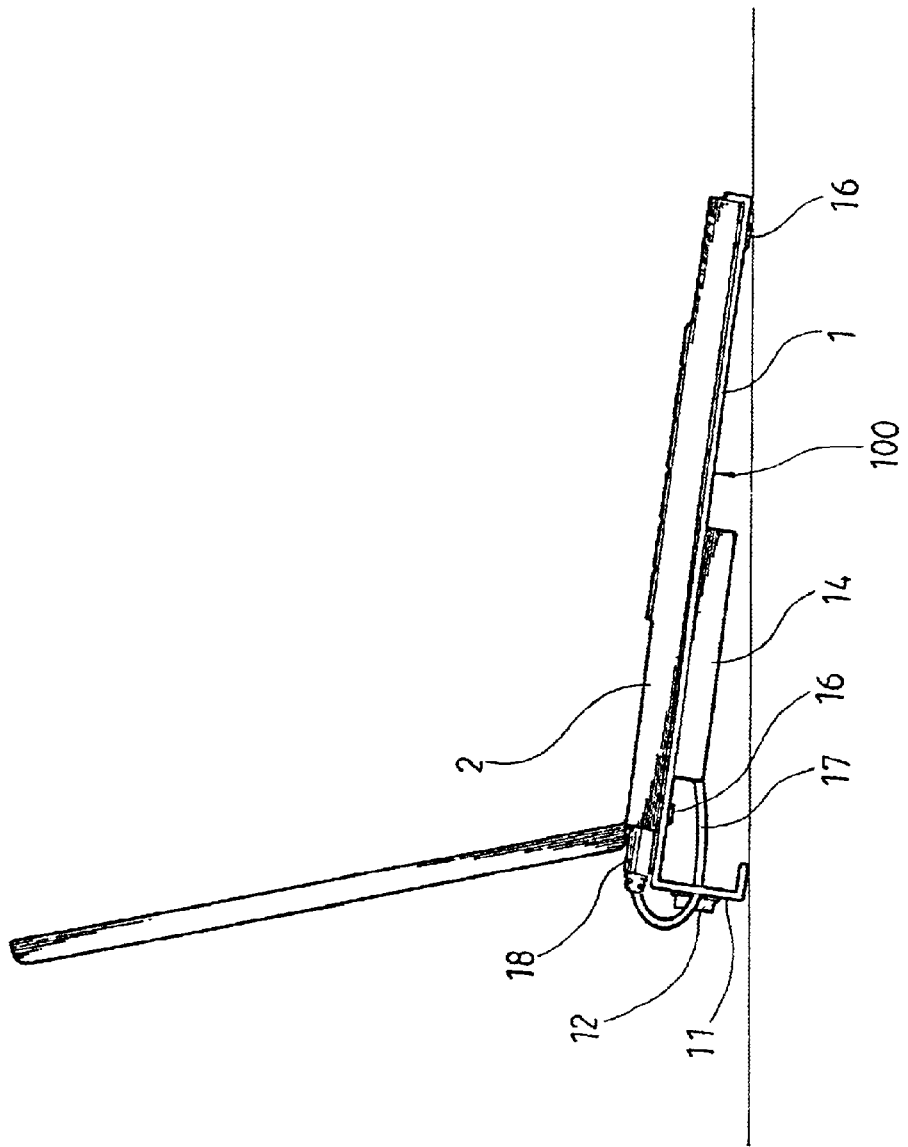
FIG. 4 is a side view showing the application of the present invention.

Referring to FIGS. 3 and 4, as the platform 100 has a spine at the rear edge, the top of the platform will form an inclination, so that when the notebook computer is placed on the platform 100, the notebook computer will be inclined at an appropriate angle, so tat the user may feel comfortable and find it convenient to operate the notebook computer, and the soft pad 16 is used for preventing slippage of the notebook computer. The electric fan 14 is used for dissipating heat generated by the local computer, so as to make the user feel more comfortable, and prolonging the service life of the notebook computer.

It will be understood a each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled the art without departing in any way from the spirit of the present invention.

I claim:

1. A platform for a notebook computer comprising:
    a frame having a first edge bent upwardly and a second edge opposite to said first edge, said second edge being bent downwardly and then frontwardly to form a pine, said spine being formed with a through hole and provided with a switch close to said through hole, a top of said frame having two circular opening; and
    two electric fans each mounted under each of said circular openings.

2. The platform for a notebook computers as claimed in claim 1, wherein said frame has four corners each having a fixing hole in which is fitted a soft pad.

3. The platform for a notebook computers as claimed in claim 1, wherein said electric fan is connected to said switch via an electric cord, and said switch is connected with an electric cord which extended out of said through hole to engage with an electric plug.

* * * * *